United States Patent
Yao et al.

(10) Patent No.: US 10,829,114 B2
(45) Date of Patent: Nov. 10, 2020

(54) VEHICLE TARGET TRACKING

(71) Applicant: Ford Global Technologies, LLC, Dearborn, MI (US)

(72) Inventors: Yixin Yao, Ann Arbor, MI (US); Mark Steven Yamazaki, Canton, MI (US); Yucong Lin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 74 days.

(21) Appl. No.: 16/268,684

(22) Filed: Feb. 6, 2019

(65) Prior Publication Data

US 2020/0247401 A1 Aug. 6, 2020

(51) Int. Cl.
| | |
|---|---|
| G06K 9/00 | (2006.01) |
| B60W 30/095 | (2012.01) |
| G06T 7/70 | (2017.01) |
| G05D 1/00 | (2006.01) |
| G01S 17/931 | (2020.01) |

(52) U.S. Cl.
CPC ....... B60W 30/0956 (2013.01); G01S 17/931 (2020.01); G05D 1/0088 (2013.01); G06K 9/00825 (2013.01); G06T 7/70 (2017.01); G06T 2207/30241 (2013.01); G06T 2207/30261 (2013.01)

(58) Field of Classification Search
CPC ............. B60W 30/0956; G01S 17/931; G06K 9/00825; G06T 7/70; G06T 2207/30241; G06T 2207/30261; G05D 1/0088
See application file for complete search history.

(56) References Cited

U.S. PATENT DOCUMENTS

| | | | | |
|---|---|---|---|---|
| 6,789,043 | B1* | 9/2004 | Nelson | G01B 7/004 |
| | | | | 702/127 |
| 7,460,951 | B2 | 12/2008 | Altan et al. | |
| 7,511,252 | B1* | 3/2009 | Pedersen | F41G 7/30 |
| | | | | 244/3.1 |
| 9,852,511 | B2 | 12/2017 | Gao et al. | |
| 10,074,279 | B1* | 9/2018 | Xu | G08G 1/096783 |
| 10,345,437 | B1* | 7/2019 | Russell | B60W 30/0956 |
| 2007/0008210 | A1 | 1/2007 | Kibayashi et al. | |

(Continued)

FOREIGN PATENT DOCUMENTS

| | | |
|---|---|---|
| CN | 106933106 A | 7/2017 |
| JP | 4097126 B2 | 6/2008 |

OTHER PUBLICATIONS

Kalman, "A New Approach to Linear Filtering and Prediction Problems", Transactions of the ASME—Journal of Basic Engineering, 82 (Series D): 35-45. Copyright © 1960 by ASME.

(Continued)

*Primary Examiner* — Aaron W Carter
(74) *Attorney, Agent, or Firm* — Frank A. MacKenzie; Bejin Bieneman PLC

(57) ABSTRACT

A system, comprising a computer that includes a processor and a memory, the memory storing instructions executable by the processor to track a target in lidar point cloud data by minimizing an error function based on a smoothed target position, a smoothed target velocity, a smoothed target acceleration and a measured target position. The processor can be further programmed to operate a vehicle based on tracking the target.

17 Claims, 8 Drawing Sheets

(56) References Cited

U.S. PATENT DOCUMENTS

| | | | | |
|---|---|---|---|---|
| 2008/0027647 | A1* | 1/2008 | Ansell | G01S 13/933 701/301 |
| 2008/0172156 | A1* | 7/2008 | Joh | G01S 13/931 701/45 |
| 2011/0077898 | A1* | 3/2011 | Loomis | G01C 21/12 702/141 |
| 2012/0242534 | A1* | 9/2012 | Rojas | G01S 13/68 342/149 |
| 2013/0181908 | A1* | 7/2013 | Santiago | G06F 3/0416 345/173 |
| 2013/0278727 | A1* | 10/2013 | Tamir | H04N 13/239 348/47 |
| 2019/0113920 | A1* | 4/2019 | Englard | G05D 1/0257 |
| 2019/0129373 | A1* | 5/2019 | Skogsrud | G05B 19/358 |
| 2019/0219400 | A1* | 7/2019 | Wang | G01S 19/49 |
| 2019/0277960 | A1* | 9/2019 | Schiffmann | G01S 13/723 |
| 2019/0310738 | A1* | 10/2019 | Dyvik | G06F 3/0418 |
| 2019/0369627 | A1* | 12/2019 | Green | B60W 50/10 |
| 2020/0025902 | A1* | 1/2020 | Vishwajeet | G01S 13/536 |
| 2020/0057160 | A1* | 2/2020 | Li | G01S 7/4808 |
| 2020/0074266 | A1* | 3/2020 | Peake | G05D 1/0231 |
| 2020/0148213 | A1* | 5/2020 | Gawande | B60W 50/14 |
| 2020/0247401 | A1* | 8/2020 | Yao | G01S 17/931 |
| 2020/0272160 | A1* | 8/2020 | Djuric | G05D 1/0223 |

OTHER PUBLICATIONS

O'Reilly, "Observer for Linear Systems", Academic Press, London, 1983, Not full document. Appendixes A and B, Author Index and Subject Index Only.

Penoyer, "The Apha-Beta Filter", Jul. 1993, http://collaboration.cmc.ec.gc.ca/science/rpn/biblio/ddj/Website/articles/CUJ/1993/9307/penoyer/penoyer.htm.

* cited by examiner

VEHICLE TARGET TRACKING

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Figure 1:
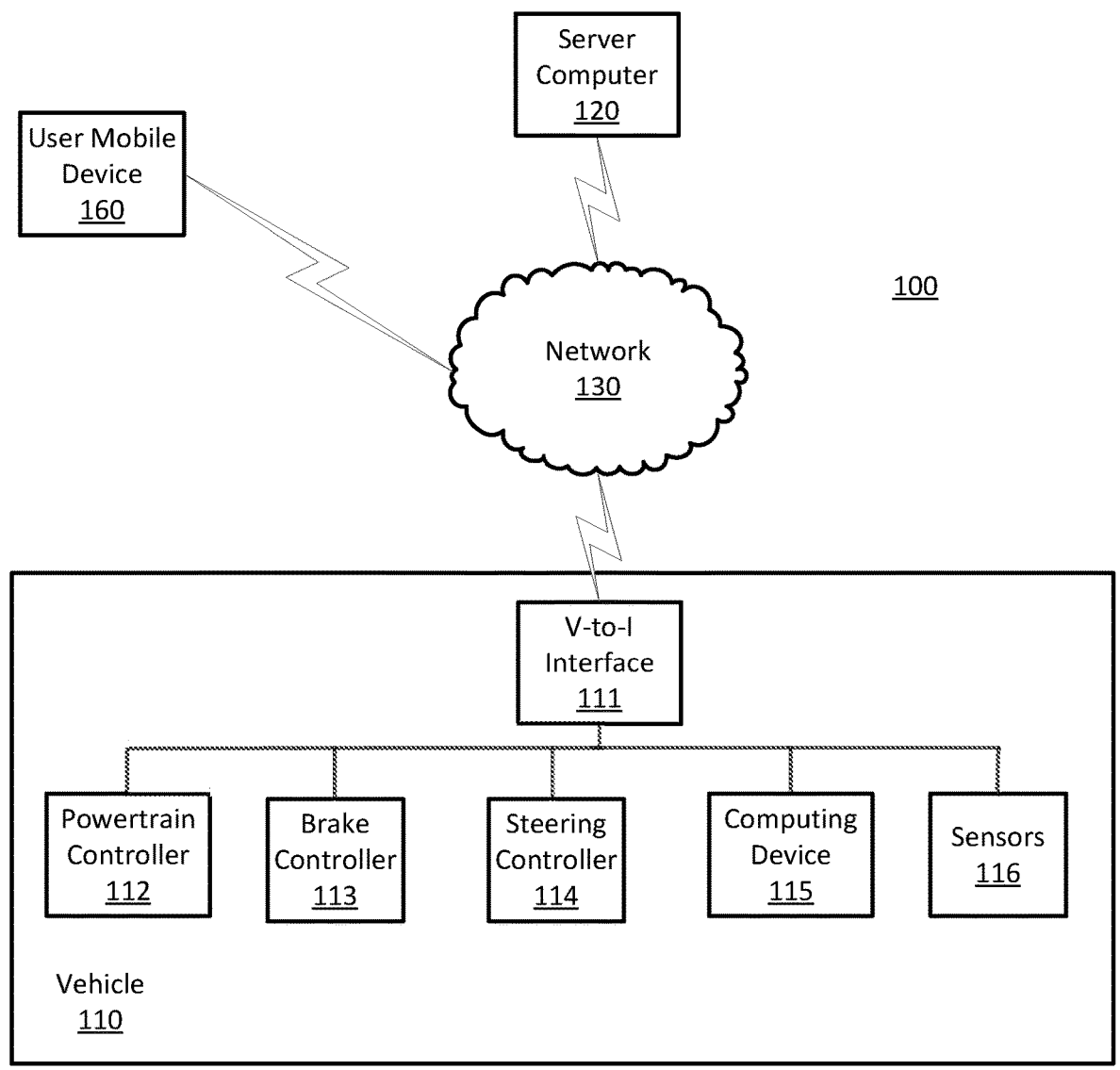
FIG. 1 is a block diagram of an example traffic infrastructure system.

Vehicles can be equipped to operate in both autonomous and occupant piloted mode. By a semi- or fully-autonomous mode, we mean a mode of operation wherein a vehicle can be piloted partly or entirely by a computing device as part of a vehicle information system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire sensor data regarding the external environment of a vehicle and to use the sensor data to determine a path upon which to operate a vehicle based on a vehicle path in autonomous or semi-autonomous mode. A vehicle path is a straight or curved line that describes successive locations (i.e., locations at different times) of a vehicle on a two-dimensional (2D) plane parallel to the surface of a roadway upon which the vehicle operates. A computing device can determine a vehicle path based on vehicle sensor data including lidar sensor data. Lidar sensor data can be processed by a computing device to determine a target, wherein a target can be one or more of a second vehicle, a pedestrian, or an animal, etc. A computing device can process time series lidar sensor data to track a target, wherein time series lidar data is a sequence of lidar data samples acquired at fixed time intervals and tracking a target includes determining a predicted position for the target based on time series lidar data. A computing device can use the predicted position of the target to determine a path upon which to operate a vehicle. For example, a computing device can determine a path that would avoid a collision or near-collision between the vehicle and the tracked object based on the predicted position.

Disclosed herein is a method, including tracking a target in lidar point cloud data by minimizing an error function based on a predicted position, a predicted velocity, and a predicted acceleration determined based on a smoothed position, a smoothed velocity, and a smoothed acceleration, respectively, and a measured target position, and operating a vehicle based on tracking the target. Tracking the target can be based on the predicted position. The predicted position predicted velocity and the predicted acceleration can be determined based on non-linear functions applied to the smoothed velocity and the smoothed acceleration. The non-linear functions can be one or more of a lookup table or fuzzy logic. Fuzzy logic can include fuzzification, inference, and defuzzification. The error function can be minimized based on the predicted velocity and the predicted acceleration determined by processing the measured target position with a scheduling rate signal generator.

The measured target position can be processed with the scheduling rate signal generator including one or more of a low pass filter or moving average filter to reduce noise in the predicted velocity and predicted acceleration. The measured target position can be determined by processing the lidar point cloud data to determine a distance to the target in an environment around the vehicle. The direction and the distance to the target can be determined by performing cluster analysis on lidar point cloud data, wherein cluster analysis includes determining the target in lidar point cloud data based on grouping lidar point cloud data points based on probabilities. Operating the vehicle can include determining a path based on the tracked target. A one-step delay operation can be performed on the smoothed position, a smoothed velocity, and a smoothed acceleration, respectively to form a delayed, smoothed position, a delayed, smoothed velocity and a delayed, smoothed acceleration. The delayed, smoothed position, the delayed, smoothed velocity and the delayed, smoothed acceleration can be combined to form the predicted position. The delayed, smoothed velocity and delayed, smoothed acceleration can be combined to form the predicted velocity. The predicted position can be subtracted from an input measured position to form an error function.

Further disclosed is a computer readable medium, storing program instructions for executing some or all of the above method steps. Further disclosed is a computer programmed for executing some or all of the above method steps, including a computer apparatus, programmed to track a target in lidar point cloud data by minimizing an error function based on a predicted position, a predicted velocity, and a predicted acceleration determined based on a smoothed position, a smoothed velocity, and a smoothed acceleration, respectively, and a measured target position, and operate a vehicle based on tracking the target. Tracking the target can be based on the predicted position. The predicted position, the predicted velocity and the predicted acceleration can be adjusted based on non-linear functions applied to the smoothed position, the smoothed velocity and the smoothed acceleration. The non-linear functions are gain-scheduled and can be one or more of a lookup table or fuzzy logic. Fuzzy logic can include fuzzification, inference, and defuzzification. The error function can be minimized by using gain-scheduled non-linear functions with the scheduling velocity and the scheduling acceleration determined by processing the measured target position with a scheduling rate signal generator.

The computer apparatus can be further programmed to process a measured target position with the scheduling rate signal generator including one or more of a low pass filter or moving average filter to reduce noise in the scheduling velocity and scheduling acceleration. The measured target position can be determined by processing the lidar point cloud data to determine a distance to the target in an environment around the vehicle. The direction and the distance to the target can be determined by performing cluster analysis on lidar point cloud data, wherein cluster analysis includes determining the target in lidar point cloud data based on grouping lidar point cloud data points based on probabilities. Operating the vehicle can include determining a path based on the tracked target. An inverse z transform can be performed on the smoothed position, a smoothed velocity, and a smoothed acceleration, respectively to form a delayed, smoothed position, a delayed, smoothed velocity and a delayed, smoothed acceleration. The delayed, smoothed position, the delayed, smoothed velocity and the delayed, smoothed acceleration can be combined to form the predicted position. The delayed, smoothed velocity and delayed, smoothed acceleration can be combined to form the predicted velocity. The predicted position can be subtracted from an input measured position to form an error function.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. Vehicle 110 also includes one or more computing devices 115 for processing data for piloting the vehicle 110 during autonomous operation. Computing devices 115 can receive information regarding the operation of the vehicle from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
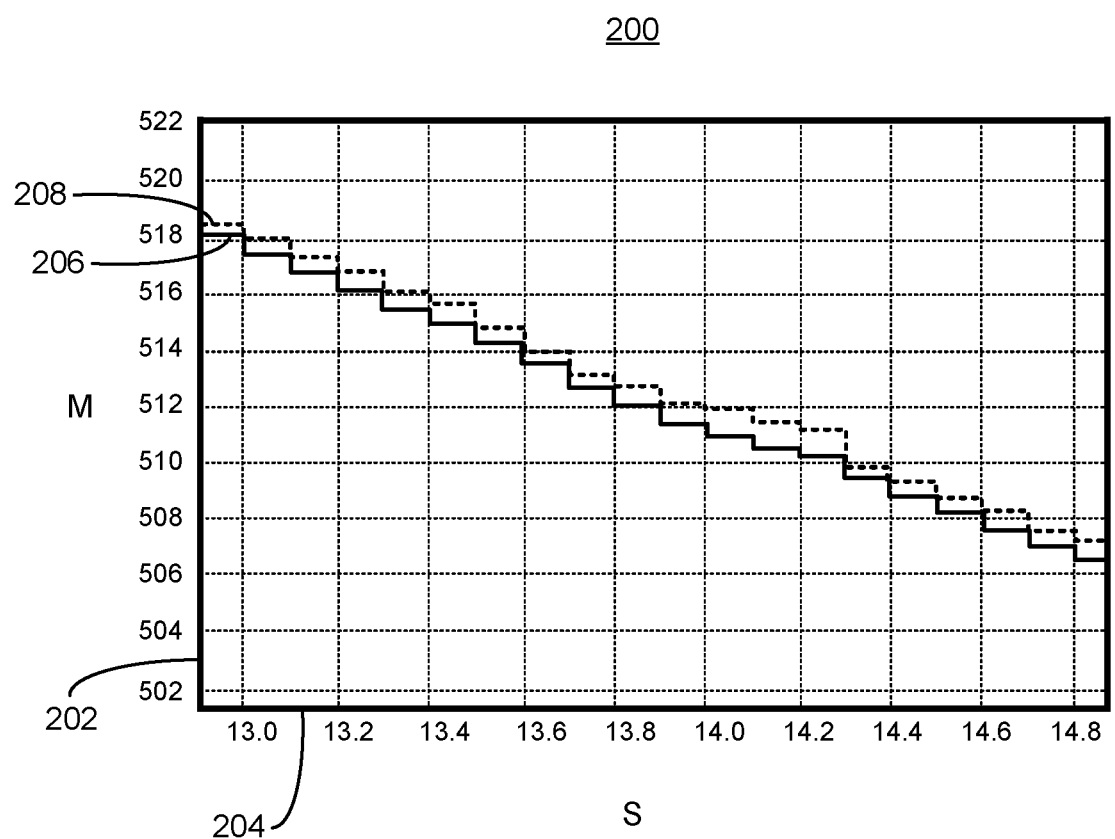
FIG. 2 is a diagram of an example graph of target tracking.

FIG. 2 is a diagram of an example target tracking graph 200. Target tracking graph 200 graphs vehicle 110 to target distance in meters on the y-axis 202 versus time in seconds on the x-axis 204. Target tracking graph 200 includes a target position 206 (solid line) and a predicted target position 208 (dashed line). Target position 206 can be determined by acquiring location information for a vehicle 110 and a target vehicle. Both vehicle 110 and a target vehicle can be equipped with GPS sensors and/or inertial measurement units (IMUs) to determine locations with respect to a global coordinate system such as latitude, longitude and altitude. Vehicle 110 and the target vehicle locations can be recorded and processed to determine target position 206 based on ground truth data to compare with predicted target positions 208 determined by target tracking.

Predicted target position 208 can be determined based on time series lidar data. Time series lidar data can be acquired by acquiring lidar samples that determine one or more distances from the lidar sensor to one or more points in an environment around the lidar sensor at periodic time intervals, for example 60 sets of samples or frames per second. Each set of samples or frame of lidar data includes distances and directions to points in the environment and can be referred to as "lidar point cloud data." The lidar point cloud data can be processed to determine one or more targets, wherein a target is defined as a region of lidar point cloud data that is grouped and distinguished from background lidar point cloud data.

Cluster analysis can group lidar point cloud data by determining probabilities for group membership for the lidar point cloud data points, for example. Cluster analysis can process each data point in lidar point cloud data to determine a most likely group to which the point belongs based on a spatial distance measure between the data point and the center of the groups. Processing lidar point cloud data to correctly assign lidar data points to a group corresponding to a target can include distinguishing lidar data points corresponding to targets from background data points. Background data points correspond to missing data in lidar point cloud data. Groups of lidar data points can be determined to correspond to targets based on the location and size of the lidar point cloud group with respect to the vehicle 110.

Once a group of lidar data points has been determined to correspond to a target, the target can be described by a single direction and a single distance from vehicle 110, as measured to a center of mass of the group of lidar point cloud data points that corresponds to the target. Both the direction and the distance to the target from the vehicle can be predicted based on techniques described herein. Estimation of the distance to the target will be discussed herein, but the techniques discussed to estimate distance to the target also apply to estimation of the direction to the target from the vehicle 110.

It can be seen by inspection of the target tracking graph 200 that the average difference between the target position 206 and the predicted target position 208 is between about 0.5 meter and about 1.0 meter over the 1.8 second interval illustrated in target tracking graph 200. For example, the average distance between the target position 206 and the predicted target position 208 is one meter over the time period from 13.2 seconds to 13.3 seconds and one meter over the time period from 13.3 seconds to 13.4 seconds. Each 0.1 second interval over the time period corresponding to target tracking graph 200 can be measured and included in a calculation that can determine an average difference between the target position 206 and the predicted target position 208 over the time period.

Computing device 115 can acquire time series lidar data and process it to determine a sequence of measured target positions that can be input to a target tracking process that produces predicted target positions that predict future positions of a target. Future positions of a target can be compared to future positions of a vehicle 110 based on a path to determine whether a collision or near-collision will result and thereby determine whether the path is safe or not safe. A goal of target tracking is to obtain accurate estimates of future target position based on raw sensor data. Raw sensor data includes some amount of signal noise, and a target tracking process should have the capability to estimate target positions in the presence of signal noise. Performance of a target tracking process can be determined according to three criteria: (1) Predicted variable accuracy, (2) Signal-to-noise ratio, and (3) Time (phase) delay. Practical engineering solutions that satisfy all three of these criteria at the same time are difficult to obtain. In some examples, a time delay can be introduced to improve signal accuracy. In other examples, a lower signal-to-noise ratio is maintained to avoid a time delay.

Target tracking processes have been developed to produce high accuracy, high signal-to-noise ratio with less time delay than previous processes. These processes can include Kalman filters for example. Kalman filters are optimal when the noise signal is Gaussian noise. Kalman filters can be extended to non-linear systems and non-Gaussian noise, but the results are limited, and the input must satisfy some conditions mathematically for the results to be valid.

Figure 3:
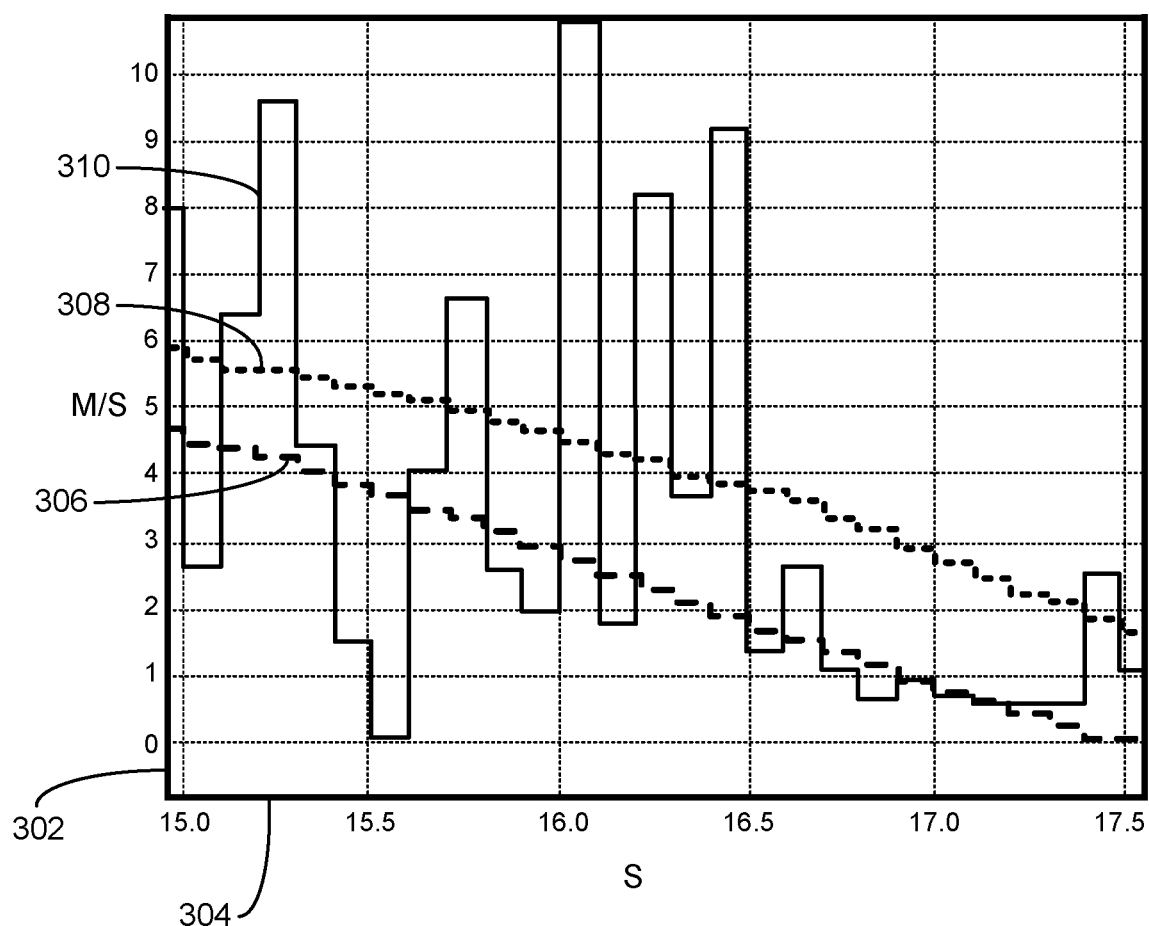
FIG. 3 is a diagram of example target tracking.

FIG. 3 is a diagram of an example target velocity tracking graph 300. Target velocity tracking graph 300 graphs velocity in meters/second on the y-axis 302 vs. time in seconds on the x-axis 304. Target velocity tracking graph 300 includes ground truth target velocity 306 (dashed line), predicted target velocity 308 (short dashed line) based on the target position measurements and estimations shown in FIG. 2, and target velocity calculated from target position measurements 310 (solid line). Ground truth target velocity 306 measures the relative velocity between a vehicle 110 and a target vehicle. As discussed above in relation to FIG. 2, ground truth velocity 306 can be determined based on GPS and/or IMU sensor data included in vehicle 110 and a target vehicle. Predicted target velocity 308 and predicted target position 208 can be determined based on measurements of targets determined in time series lidar data by inputting the target measurements into a Kalman filter, as is known in the art. A Kalman filter can use a scheduling rate signal generator to generate smoothed velocity estimates and smoothed acceleration estimates based on time series target measurements. A Kalman filter combines target measurements, smoothed velocity and smoothed acceleration according to equations similar to equations (1)-(6), below, without non-linear functions. The non-linear functions of equations (4)-(6) are replaced by a Kalman filter that can be adjusted to determine values for predicted target position 208 and predicted velocity 308. Predicted target position 208 and predicted velocity 308 can be filtered, delayed and subtracted from measured target position to form an error function e. Inputting the error function e to the Kalman filter as feedback permits the Kalman filter to minimize the error function e based on time series target measurements and thereby improve the accuracy of predicted target position 208 and predicted velocity 308, where accuracy can be measured versus ground truth data, for example. Adjusting Kalman filter parameters can determine the rate and stability with which a Kalman filter minimizes the error function e.

As can be seen from inspection of target velocity tracking graph 300, the predicted target velocity 308 has a delay of between about 1.0 second to about 1.2 seconds and has a magnitude of deviation of about two meters/second. Tracking targets in this fashion using Kalman filters can require long time delays to prevent unstable system operation that can result from unstable input such as velocity calculated from target position measurements 310. Long time delays can result in problematic performance when being relied upon for autonomous operation of a vehicle 110. Techniques described herein improve target tracking for vehicle operation by improving Kalman filters by adding non-linear functions to smoothed estimates of position, velocity, and acceleration to form predicted positions, velocities and accelerations.

Figure 4:
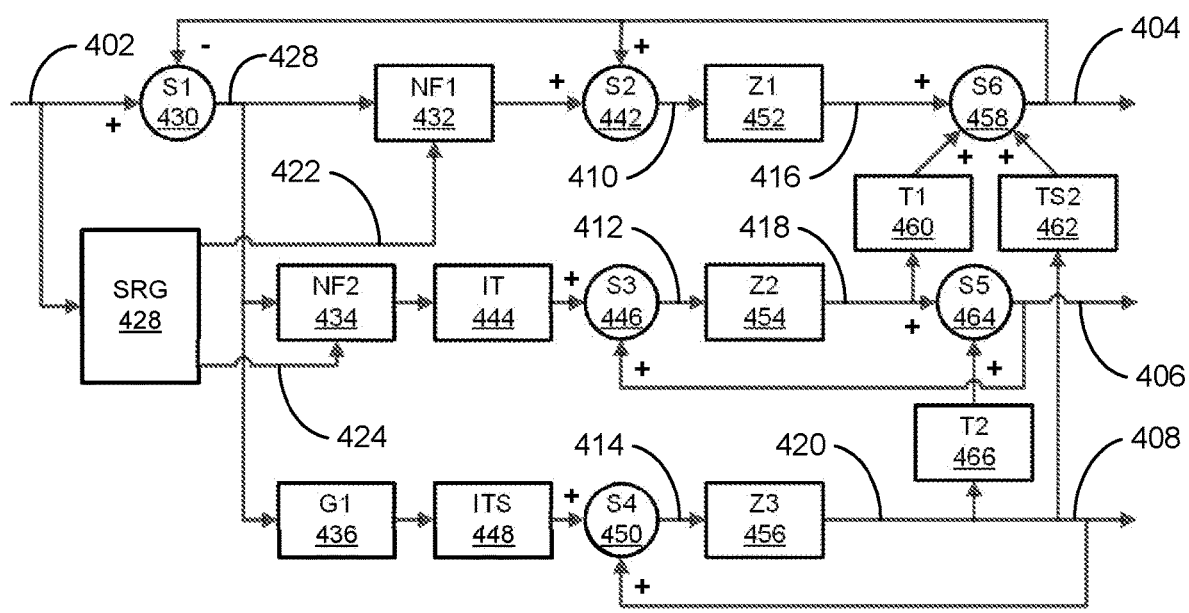
FIG. 4 is a diagram of an example target tracker.

FIG. 4 is a diagram of a target tracking system 400. Target tracking system 400 can perform target state estimation, defined as predictions of position, velocity and acceleration of a target based on input measured position $x_m(k)$ 402 corresponding to distances from a vehicle 110 to the center of mass of identified regions in time series lidar point cloud data corresponding to a three-dimensional object in the environment around a vehicle 110. Target tracking system 400 processing for state estimation is based on the measured position input $x_m(k)$ 402 and is divided into two stages: smoothing and prediction. Smoothing stages produce smoothed position, smoothed velocity and smoothed acceleration corresponding to intermediate values $x_s(k)$ 410, $v_s(k)$ 412 and $a_s(k)$ 414 respectively, where smoothing refers to processing a time series of data values to reduce variation in value over time.

Prediction stages input the smoothed values and generate predicted position, velocity and acceleration as outputs $x_p(k)$ 404, $v_p(k)$ 406 and $a_p(k)$ 408, respectively, where predicting refers to processing a time series of data values to estimate a future value. The tracker functions, $f_\alpha(\hat{\omega}_r)$ 432, $f_\beta(\hat{\alpha}_r)$ 434 and $\gamma(e)$ 420, are scheduled by using a scheduling rate signal generator 428 (SRG) based on the tracker input signal $x_m(k)$ 402 to generate scheduling velocity $\hat{\omega}_r$ 422 and scheduling acceleration $\hat{\alpha}_r$ 424 from noisy measured position $x_m(k)$ 402. Scheduling rate signal generator 428 is discussed in relation to FIG. 5.

Target tracking system 400 can be described by the following discrete state equations, wherein T is sampling time:

Prediction $$x_p(k+1) = x_s(k) + Tv_s(k) + \frac{1}{2}T^2 a_s(k) \quad (1)$$

$$v_p(k+1) = v_s(k) + Ta_s(k) \quad (2)$$

$$a_p(k+1) = a_s(k) \quad (3)$$

Smooth $$x_s(k) = x_p(k) + f_\alpha(\hat{\omega}_r)[x_m(k) - x_p(k)] \quad (4)$$

$$v_s(k) = v_s(k-1) + f_\beta(\hat{\alpha}_r)\frac{1}{T}[x_m(k) - x_p(k)] \quad (5)$$

$$a_s(k) = a_s(k-1) + \gamma(e)\frac{1}{2T^2}[x_m(k) - x_p(k)] \quad (6)$$

wherein $f_\alpha(\hat{\omega}_r)$ 432 (NF1), and $f_\beta(\hat{\alpha}_r)$ 434 (NF2), and $\gamma(e)$ 436 (G1) are non-linear functions that generate smoothed position $x_s(k)$ 410, smoothed velocity $v_s(k)$ 412 and smoothed acceleration $a_s(k)$ 414 based on scheduling velocity $\hat{\omega}_r$ 422, scheduling acceleration $\hat{\alpha}_r$ 424 and an error function $e=e(k)$ 426, respectively.

In target tracking system 400, the noisy measured position $x_m(k)$ 402 is sent to a summer 430 (S1) to be summed with a predicted position output $x_p(k)$ 404 with one step delay for $x_p(k+1)$. Error function $e=e(k)$ 428 indicates a difference between the measured and predicted values. In order to reduce the error at the output of the tracker, the weighted functions $f_\alpha(\hat{\omega}_r)$ 432, $f_\beta(\hat{\alpha}_r)$ 434 and $\gamma(e)$ 438 are used in estimating the generate smoothed position $x_s(k)$ 410, smoothed velocity $x_s(k)$ 412 and smoothed acceleration $a_s(k)$ 414 respectively. In this fashion the error function e=e(k) can be minimized by adjusting the predicted output to reduce a portion of the error function e=e(k) at each time step, thereby increasing the accuracy of the predicted position $x_p(k)$ 404 with respect to the measured position $x_m(k)$ 402.

The functions $f_\alpha(\hat{\omega}_r)$ 432 and $f_\beta(\hat{\alpha}_r)$ 434 are non-linear and their gains are automatically adjusted as a function of scheduling velocity $\hat{\omega}_r$ 422 and scheduling acceleration $\hat{\alpha}_r$ 424 that describe the current operating points of velocity and acceleration. Target tracking system 400 can determine an estimated position by using rate $\hat{\omega}_r$ 422 of position (velocity) and determine estimated velocity by using rate $\hat{\alpha}_r$ 424 of velocity (acceleration). When the measured signal rates are lower, the function gains should be larger to reduce mainly measured signal noises. When the measured signal rates are higher, the function gains should be smaller to produce less time delay. As a result of operation of target tracking system 400, predicted position output $x_p(k)$ 404, $v_p(k)$ 406 and $a_p(k)$ 408 can be obtained with higher signal/noise ratios and less time delay than other linear filters, such as alpha-beta-gamma filters, as are known in the art, can produce with similar input data.

To produce a predicted position output $x_p(k)$ 404 with a delay of one sample time T, error function e=e(k) 428 is input to non-linear function $f_\alpha(\hat{\omega}_r)$ 432 along with scheduling velocity $\hat{\omega}_r$ 422. Non-linear functions will be discussed in relation to FIG. 6. Output from non-linear function $f_\alpha(\hat{\omega}_r)$ 432 combined with predicted position $x_p(k)$ 404 at summer 442 (S2) to form smoothed position $x_s(k)$ 410. In similar fashion, non-linear function $f_\beta(\hat{\alpha}_r)$ 434 inputs error function e=e(k) 428 and scheduling acceleration $\hat{\alpha}_r$ 424 and outputs a value to be divided by sample time T at block 444 (IT) and combined with predicted velocity $v_p(k)$ 406 at summer 446 (S3) to form smoothed velocity $v_s(k)$ 412. Likewise, gamma function γ(e) 438 inputs error function e=e(k) 428 and outputs a value to be divided by $T^2$ at block 448 (IT2) and combined with predicted acceleration $a_p(k)$ 408 to form smoothed acceleration $a_s(k)$ 414.

Smoothed position $x_s(k)$ 410, smoothed velocity $v_s(k)$ 412, and smoothed acceleration $a_s(k)$ 414 are input to one-step delay operation blocks 452, 454, 456 (Z1, Z2, Z3), respectively, to delay the signals one time step. The delayed, smoothed position $x_s(k-1)$ 416 is combined at summer 458 (S6) with delayed, smoothed velocity $v_s(k-1)$ 418 times T at block 460 (T1) and delayed, smoothed acceleration $a_s(k-1)$ 414 times $T^2/2$ at block 462 (TS2) to form predicted position $x_p(k)$ 404. Delayed, smoothed acceleration $a_s(k-1)$ 414 times T a block 466 (T2) is combined at summer 464 (S5) with delayed, smoothed velocity $v_s(k-1)$ 418 to form predicted velocity $v_p(k)$ 406. Delayed, smoothed acceleration $a_s(k-1)$ 414 is output as predicted acceleration $a_p(k)$ 408.

By using non-linear functions $f_\alpha(\hat{\omega}_r)$ 432 and $f_\beta(\hat{\alpha}_r)$ 434 to form predicted position $x_p(k)$ 404, a large error function e=e(k) 428 can be reduced with a short time delay by outputting values from non-linear functions $f_\alpha(\hat{\omega}_r)$ 432 and $f_\beta(\hat{\alpha}_r)$ 434 are proportional to the error function e=e(k) 428 to cause target tracking system to output a predicted position $x_p(k)$ 404 that estimates the target position based on the input measured positions $x_m(k)$ 402 in a minimal number of time steps. Once the error function e=e(k) 428 is determined to be small, the values output from non-linear functions $f_\alpha(\hat{\omega}_r)$ 432 and $f_\beta(\hat{\alpha}_r)$ 434 correspond to values that are less than proportional to the error function e=e(k) 428, for example, to prevent target tracking system 400 from amplifying signal noise. In this fashion target tracking system 400 can minimize the error function e=e(k) 426 proportionally to the size of the error to reduce time delay without causing unstable system behavior.

A scheduling rate signal generator 428 inputs noisy measured positions $x_m(k)$ 402 and outputs scheduling velocity $\hat{\omega}_r$ 422 and scheduling acceleration $\hat{\alpha}_r$ 424. The resultant smoothed estimates of velocity $v_s(k)$ 412 and acceleration $a_s(k)$ 414 to be used in determining predicted position $x_p(k)$ 404, predicted velocity $v_p(k)$ 406, and predicted acceleration $a_p(k)$ 408. Scheduling rate signal generator 428 receives as input a measured position $x_m(k)$ 402. Measured position $x_m(k)$ 402 is one of a time series where k∈ {1, ..., k, ..., N}. Scheduling rate signal generator can generate a scheduling velocity $\hat{\omega}_r(k)$ 422 and a scheduling acceleration $\hat{\alpha}_r(k)$ 424 from noisy measured position $x_m(k)$ 402 measurements. A common technique to obtain velocity from a position measurement $x_m(k)$ 402 is to use the backward difference operator, which is $\hat{\omega}_r=[x_m(k)-x_m(k-1)]/T$. It can also be used to derive the acceleration theoretically. But it is impossible to apply it in the real systems because its noise-amplifying characteristics produce quantization noisy velocity and acceleration. The bandwidth of scheduling velocity and acceleration, comparing with the estimated velocity and acceleration, are lower to satisfy the scheduling signal characteristic. To reduce noise amplification of backward difference operating, the scheduling rate signal generator 428 with a closed-loop structure is can be applied to reduce signal noise and smooth the output signals. The scheduling rate signal generator 428 can have the effect of a low pass filter or a moving average filter on the input measured position $x_m(k)$ 402 data.

Figure 5:
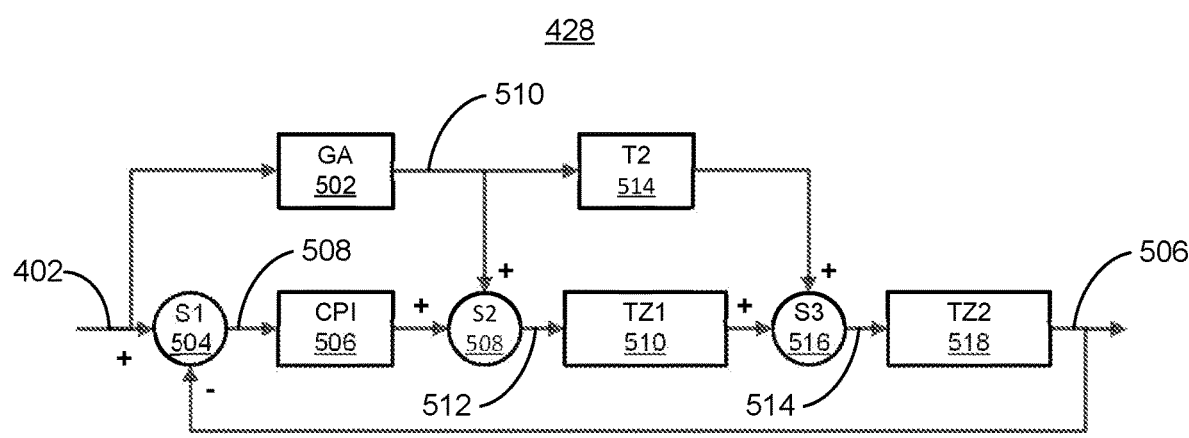
FIG. 5 is a diagram of an example schedule rate generator.

FIG. 5 is a diagram of a scheduling rate signal generator 428. In scheduling rate signal generator 428, the input signal $x_m(k)$ 402 is sent to transfer function $G_a(z)$ 502 (GA) and a summer 504 (S1) to be combined with a filter output $\hat{x}_m(k)$ 506, where $G_a(z)$ 502 is a second differentiator with a low pass filter or moving average filter to reduce noise level. The signal error $\hat{e}_r(k)$ 508 is adjusted by using a gain PI controller $C_{pi}(z)$ 506 (CPI) and combined with $G_a(z)$ 502 output $\hat{\alpha}_0(k)$ 510 at summer 508 (S2) to produce acceleration function $\hat{\alpha}_r(k)$ 512 that can be multiplied times $T/(1-z^{-1})$ and combined with output $\hat{\alpha}_0(k)$ 510 multiplied times T/2 at block 514 (T2) at summer 516 (S3) to form velocity function $\hat{\omega}_r(k)$ 514. Scheduling velocity $\hat{\omega}_r(k)$ 514 can be multiplied times $T/(1-z^{-1})$ at block 518 (TZ2) to form filter output $\hat{x}_m(k)$ 506. The scheduling rate signal generator 428 is a control system with a dual integrator controlled plant $[T/(1-z^{-1})]^2$ and PI controller to produce lower noisy velocity and acceleration scheduling signal $\hat{\omega}_r$ and $\hat{\alpha}_r$ for operation of target tracking system 400 of FIG. 4.

Figure 6:
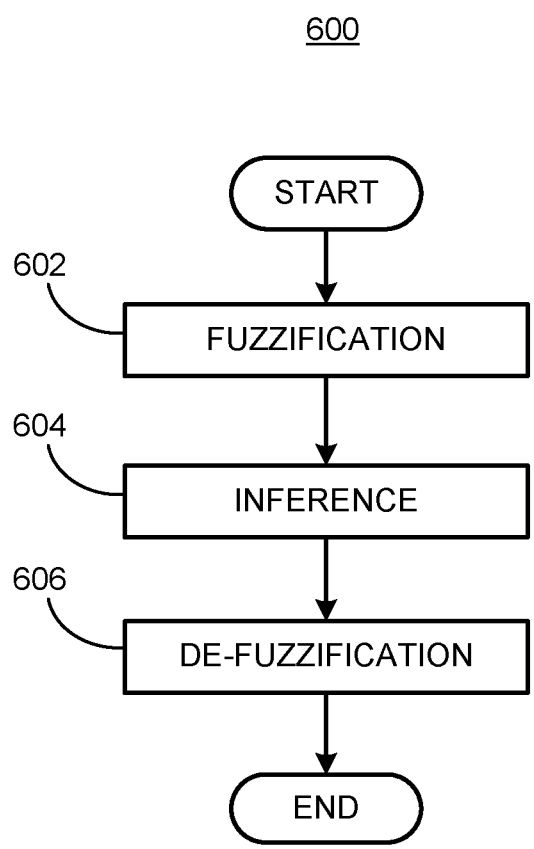
FIG. 6 is a flowchart diagram of an example fuzzy logic inference process.

FIG. 6. is a flowchart diagram of a process 600 to determine a non-linear function $f_\alpha(\hat{\omega}_r)$ 432 or $f_\beta(\hat{\alpha}_r)$ 434 of input variables $\hat{\omega}_r$, $\hat{\alpha}_r$ and e based on fuzzy logic. A non-linear function is a mapping from a domain of real numbers to a range of real numbers that cannot be represented by a polynomial function. Fuzzy logic can map input real numbers to output real numbers based on logical operations between inputs. Process 600 can be implemented by a processor of computing device 115, taking as input information from sensors 116. Process 600 includes multiple blocks taken in the disclosed order. Process 600 could alternatively or additionally include fewer blocks or can include the blocks taken in different orders.

Process 600 begins at block 602, where input stage maps $\hat{\omega}_r(k)$, $\hat{\alpha}_r(k)$ and e(k) inputs to the appropriate membership functions with a fuzzification transform. A fuzzification transform maps each input variable, which can be a single value, for example, into a range of values. The fuzzification transforms each of the input signals $\hat{\omega}_r(k)$, $\hat{\alpha}_r(k)$, and $e(k)$ into ranges of values. For example, data values corresponding to input signals $\hat{\omega}_r(k)$ and $e(k)$ can be fuzzified by mapping them into ranges corresponding to a "low" range and a "high" range according to thresholds determined empirically using vehicle test data.

At block 604 the inference stage determines which rules from a list of an acquired set of fuzzy rules applies to the inputs and determines a corresponding output membership function by combining ranges of values, for example, according to rules of logic applied to the members of the ranges. A membership function defines how ranges of values in input signals $\hat{\omega}_r(k)$, $\hat{\alpha}_r(k)$, and $e(k)$ are mapped to an output membership range. A fuzzy rule can combine input values based on combining the value ranges to form intersections and sums. For example, a logical AND operation applied to real numbers requires that both input values be the exact same value to result in a "1" or TRUE output. A fuzzy rule can output a membership function equal to a TRUE output range based on an overlap in value ranges between two fuzzy variables where the input variables real values were different, but within a user determined difference, for example. The inference stage is a decision process based on the acquired set of fuzzy rules. The rules can be based on an analysis of results for previously acquired vehicle test data. For example, non-linear function $f_\alpha(\hat{\omega}_r)$ can implement a membership function based on $\hat{\omega}_r(k)$ and $e(k)$ where $\hat{\omega}_r(k)=$"high" and $e(k)=$"high" combine to form a "high" output, and where $\hat{\omega}_r(k)=$"low" and $e(k)=$"high" combine to form a "low" output. This membership function can cause target tracking system 300 output a "high" output and large correction signal when the velocity is "high" and the error is "high" to decrease time delay. When the velocity is "low" and the error is "high", a "low" output will increase signal-to-noise by outputting a small correction signal. An inference stage can implement a plurality of rules defining membership functions that combine to form an output membership function.

At block 606 the output membership function or fuzzy results from block 604 can be defuzzified to a numerical value. The output membership function can be defuzzified using a centroid defuzzification technique with min-max inference and output as smoothed, non-linear filtered values. A centroid defuzzification technique determines the average value of the range of values corresponding to a fuzzy result and replaces the range of values with the weighted average value of the range. Min-max inference can determine a single value to replace a range of values based on an average between the minimum and the maximum.

In other examples of process 660, non-linear functions $f_\alpha(\hat{\omega}_r)$ 432 or $f_\beta(\hat{\alpha}_r)$ 434 of input variables $\omega_r$, $\alpha_r$, and e can be determined using lookup tables rather than fuzzy logic. In a lookup table, values of $f_\alpha(\hat{\omega}_r)$ 432 or $f_\beta(\hat{\alpha}_r)$ 434 corresponding to input values of input variables $\omega_r$, $\alpha_r$, and e are determined and stored in a lookup table to be recalled when executing the process. An example of fuzzy logic applied to non-linear functions $f_\alpha(\hat{\omega}_r)$ 432 or $f_\beta(\hat{\alpha}_r)$ can include testing values of $f_\alpha(\hat{\omega}_r)$ 432 or $f_\beta(\hat{\alpha}_r)$ to determine if they are approximately equal to stored values predetermined by user input. Fuzzy logic as described by process 600 can determine if values are approximately equal, whereas an arithmetic comparison can determine if the values are exactly equal or not. Following this step process 600 ends.

Figure 7:
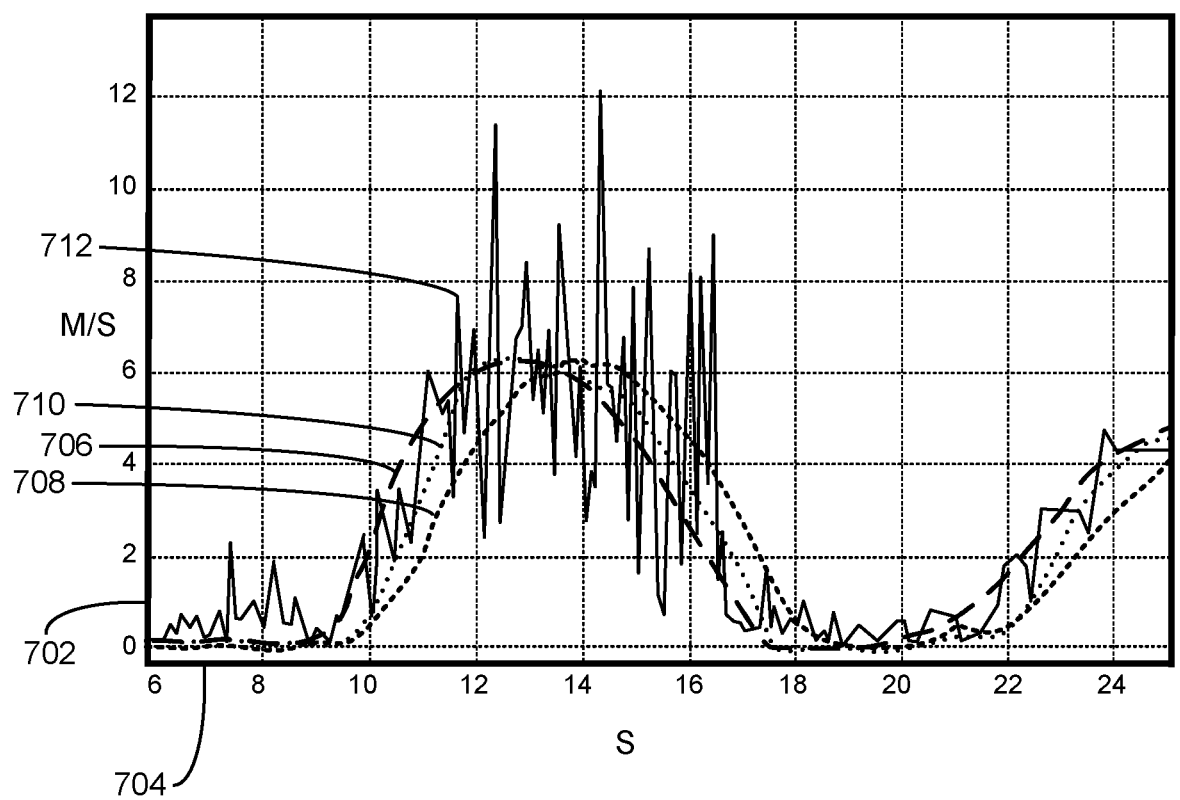
FIG. 7 is a diagram of an example graph of target tracking.

FIG. 7 is a diagram of example target velocity tracking graph 700. Target velocity tracking graph 700 graphs velocity in meters/second on the y-axis 702 vs. time in seconds on the x-axis 704. Target velocity tracking graph 700 includes ground truth target velocity 706 (dashed line), original filter predicted target velocity 708 (short dashed line), non-linear predicted target velocity 710 (dotted line), and velocity calculated from target position measurements 710 (solid line). As discussed above in relation to FIG. 2, ground truth velocity 706 can be determined based on GPS and/or IMU sensor data included in vehicle 110 and the target vehicle. Ground truth location based on GPS and/or IMU sensor data is only used for illustrating results herein; in use, a target tracking system 400 does not require any ground truth location information input from location sensors included in either a vehicle 110 or a target. Target tracking graph 700 illustrates simulation test results including original filter predicted target velocity 708 based on velocity predictions described in relation to FIG. 2 and non-linear predicted target velocity 710 from target tracker system 400. It can be determined by inspection of target velocity tracking graph 700 that target tracking performance has been improved including reducing time delay of velocity estimation by target tracker system 400.

Figure 8:
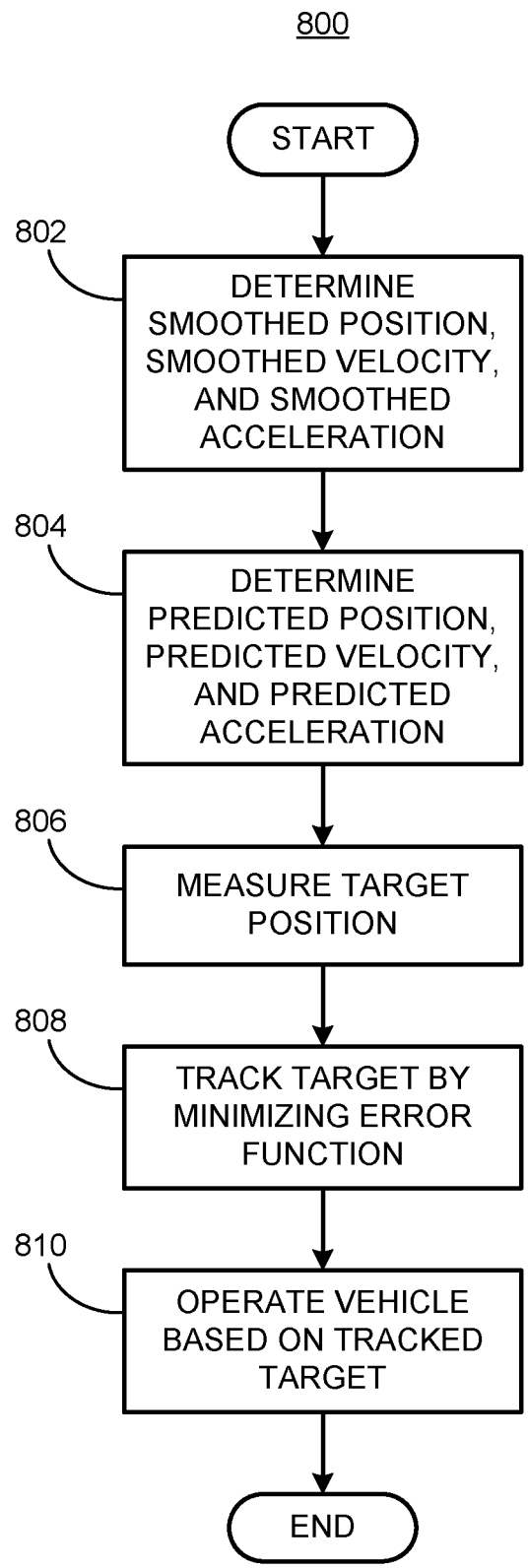
FIG. 8 is a flowchart diagram of an example process to operate a vehicle based on a tracked target.

FIG. 8 is a diagram of a flowchart, described in relation to FIGS. 1-7, of a process 800 for operating a vehicle 110 based on tracking a target. Process 800 can be implemented by a processor of computing device 115, taking as input information from sensors 116, and executing commands and sending control signals via controllers 112, 113, 114, for example. Process 800 includes multiple blocks taken in the disclosed order. Process 800 could alternatively or additionally include fewer blocks or can include the blocks taken in different orders.

Process 800 begins at block 802, wherein a computing device 115 in a vehicle 110 determines a smoothed position $x_s(k)$ 410, smoothed velocity $v_s(k)$ 412, and smoothed acceleration $a_s(k)$ 414 based on a measured position $x_m(k)$ 402 as described in relation to FIGS. 4, 5 and 6. The measured position $x_m(k)$ 402 can be part of a time series of measured positions $x_m(k)$ 402 determined by processing time series lidar data to identify a target, for example a vehicle, and produce distance measurements to the target.

At block 804, computing device 115 determines predicted position $x_p(k)$ 404, predicted velocity $v_p(k)$ 406 and predicted acceleration $a_p(k)$ 408 based on the smoothed position $x_s(k)$ 410, smoothed velocity $v_s(k)$ 412, smoothed acceleration $a_s(k)$ 414, and measured position $x_m(k)$ 402 as discussed above in relation to FIGS. 4,5 and 6.

At block 806, computing device 806 tracks the target by generating an error function error function $e=e(k)$ 426 at each time interval as discussed above in relation to FIGS. 4, 5 and 6. By determining the smoothed position $x_s(k)$ 410, smoothed velocity $v_s(k)$ 412, smoothed acceleration $a_s(k)$ 414 based on the error function $e=e(k)$ 426 at each step, target tracking system 400 can minimize the error function $e=e(k)$ 426 proportionally to the size of the error to reduce time delay without causing unstable system behavior as discussed above in relation to FIG. 4.

At block 808 computing device 115 can operate a vehicle 110 based on the predicted position $x_p(k)$ 404, predicted velocity $v_p(k)$ 406 and predicted acceleration $a_p(k)$ 408 for a target. As discussed above, a computing device can determine a path that predicts vehicle 110 travel and control vehicle powertrain, steering, braking components to cause the vehicle 110 to travel along the path. Computing device 115 can receive predicted position $x_p(k)$ 404, predicted velocity $v_p(k)$ 406 and predicted acceleration $a_p(k)$ 408 for a target and based on the target predictions determine where the target will be in real world coordinates with respect to the vehicle 110 as the vehicle 110 travels along the path. Computing device 115 can use the target predictions to determine if the vehicle 110 will encounter a collision or near-collision with the target, for example. Following block 806 process 800 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
   tracking a target in lidar point cloud data by minimizing an error function based on a predicted position, a predicted velocity, and a predicted acceleration determined based on a smoothed position, a smoothed velocity, and a smoothed acceleration, respectively, and a measured target position; and
   operating a vehicle based on tracking the target.

2. The method of claim 1, wherein determining the predicted position, predicted velocity and the predicted acceleration includes applying non-linear functions to the smoothed velocity and the smoothed acceleration.

3. The method of claim 2, wherein the non-linear functions are one or more of a lookup table or fuzzy logic.

4. The method of claim 1, wherein the predicted velocity and the predicted acceleration are determined by processing the measured target position with a scheduling rate signal generator.

5. The method of claim 4, wherein processing the measured target position with the scheduling rate signal generator includes one or more of a low pass filter or moving average filter to reduce noise in the predicted velocity and predicted acceleration.

6. The method of claim 1, further comprising determining the measured target position by processing the lidar point cloud data to determine a distance to the target in an environment around the vehicle.

7. The method of claim 6, further comprising determining the distance to the target by performing cluster analysis on lidar point cloud data, wherein cluster analysis includes determining the target in lidar point cloud data based on grouping lidar point cloud data points based on probabilities.

8. The method of claim 1, wherein operating the vehicle includes determining a path based on the tracked target.

9. A system, comprising a processor; and
   a memory, the memory including instructions executable by the processor to:
   track a target in lidar point cloud data by minimizing an error function based on a predicted position, a predicted velocity, and a predicted acceleration determined based on a smoothed position, a smoothed velocity, a smoothed acceleration, respectively, and a measured target position; and
   operate a vehicle based on tracking the target.

10. The system of claim 9, wherein determining the predicted position, predicted velocity and the predicted acceleration includes applying non-linear functions to the smoothed velocity and the smoothed acceleration.

11. The system of claim 10, wherein the non-linear functions are one or more of a lookup table or fuzzy logic.

12. The system of claim 9, wherein the predicted velocity and the predicted acceleration are determined by processing the measured target position with a scheduling rate signal generator.

13. The system of claim 12, wherein processing the measured target position with the scheduling rate signal generator includes one or more of a low pass filter or moving average filter to reduce noise in the predicted velocity and predicted acceleration.

14. The system of claim 9, wherein the instructions further include instructions to determine the measured target position by processing the lidar point cloud data to determine a distance to the target in an environment around the vehicle.

15. The system of claim 14, wherein the instructions further include instructions to determine the distance to the target by performing cluster analysis on lidar point cloud data, wherein cluster analysis includes determining the target in lidar point cloud data based on grouping lidar point cloud data points based on probabilities.

16. The system of claim 9, wherein operating the vehicle includes determining a path based on the tracked target.

17. A system, comprising:
means for controlling vehicle steering, braking and powertrain; and
means for:
tracking a target in lidar point cloud data by minimizing an error function based on a predicted position, a predicted velocity, and a predicted acceleration determined based on a smoothed position, a smoothed velocity, and a smoothed acceleration, respectively, and a measured target position; and
operating a vehicle based on tracking the target and the means for controlling vehicle steering, braking and powertrain.

* * * * *